United States Patent
Frey et al.

(10) Patent No.: US 12,304,271 B2
(45) Date of Patent: *May 20, 2025

(54) TRAILER SUSPENSION

(71) Applicant: Flyer Next, LLC, Los Angeles, CA (US)

(72) Inventors: Nicholas Brett Frey, La Crescenta, CA (US); Amit Nechushtan, Los Angeles, CA (US); Matthew Phillip Amano, Ranchos Palos Verdes, CA (US); Bryce Makoto Hirai, Tustin, CA (US)

(73) Assignee: Flyer Next, LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/541,991

(22) Filed: Dec. 15, 2023

(65) Prior Publication Data

US 2025/0100336 A1 Mar. 27, 2025

Related U.S. Application Data

(63) Continuation of application No. 18/474,999, filed on Sep. 26, 2023, now Pat. No. 11,897,307.

(51) Int. Cl.
*B60G 9/00* (2006.01)
*B60G 11/27* (2006.01)
*B60G 11/30* (2006.01)

(52) U.S. Cl.
CPC ............. *B60G 9/003* (2013.01); *B60G 11/27* (2013.01); *B60G 11/30* (2013.01); *B60G 2202/15* (2013.01); *B60G 2300/04* (2013.01)

(58) Field of Classification Search
CPC ........ B60G 9/003; B60G 11/27; B60G 11/30; B60G 2202/15; B60G 2300/04
See application file for complete search history.

(56) References Cited

U.S. PATENT DOCUMENTS

| | | |
|---|---|---|
| 4,465,298 A | 8/1984 | Raidel, Sr. |
| 5,785,341 A | 7/1998 | Fenton |

(Continued)

FOREIGN PATENT DOCUMENTS

| | | |
|---|---|---|
| AU | 2009100804 A4 | 9/2009 |
| CA | 2441770 C | 3/2007 |

(Continued)

OTHER PUBLICATIONS

Kelderman, "Leaf Spring Axle Trailer Air Suspension," accessed on Sep. 11, 2023, retrieved from https://kelderman.com/shop/leaf-spring-axle-trailer-air-suspension; 4 pages.

(Continued)

*Primary Examiner* — Toan C To
(74) *Attorney, Agent, or Firm* — Sterne, Kessler, Goldstein & Fox P.L.L.C.

(57) ABSTRACT

The suspension system for a trailer is disclosed. The suspension system includes a torsion axle and an air spring operating to accommodate a wide range of a load weight applied to the trailer without any change in ride comfort. The air spring can be adjusted for its pressure inside to cover a heavy load weight, while the torsion axle can have relatively softer spring materials therein to cover a light (and zero) load weight. The air spring and the torsion axle are arranged in series to provide adequate suspension based on the load weight.

19 Claims, 4 Drawing Sheets

(56) References Cited

U.S. PATENT DOCUMENTS

| | | | |
|---|---|---|---|
| 6,015,158 A | 1/2000 | Overby | |
| 6,328,324 B1 | 12/2001 | Fenton | |
| 6,340,165 B1* | 1/2002 | Kelderman | B60G 21/0556 280/124.153 |
| 6,454,283 B1 | 9/2002 | Fenton | |
| 6,820,887 B1* | 11/2004 | Riggle | B62D 53/0864 280/490.1 |
| 6,923,452 B1* | 8/2005 | Zachmeier | B60P 1/027 280/6.151 |
| 7,144,031 B2 | 12/2006 | Fenton | |
| 7,726,674 B2* | 6/2010 | VanDenberg | B60G 11/62 267/257 |
| 7,758,056 B2* | 7/2010 | VanDenberg | B60G 11/62 280/124.128 |
| 7,980,577 B2 | 7/2011 | Vandenberg et al. | |
| 8,220,809 B2 | 7/2012 | VanDenberg et al. | |
| 8,328,211 B2 | 12/2012 | VanDenberg et al. | |
| 9,731,780 B2 | 8/2017 | Strong et al. | |
| 10,434,833 B1* | 10/2019 | Samet | B60G 11/225 |
| 10,766,331 B2* | 9/2020 | Kliewer | B60G 17/0523 |
| 11,897,307 B1* | 2/2024 | Frey | B60G 11/225 |
| 2010/0207346 A1* | 8/2010 | VanDenberg | B60G 11/225 267/64.11 |
| 2010/0264613 A1* | 10/2010 | VanDenberg | B60G 7/00 280/124.157 |
| 2010/0270769 A1* | 10/2010 | VanDenberg | B60G 21/05 280/124.157 |
| 2014/0225351 A1* | 8/2014 | VanDenberg | B60G 11/225 280/684 |
| 2024/0034116 A1* | 2/2024 | Coombs | B60G 17/0165 |

FOREIGN PATENT DOCUMENTS

| | | |
|---|---|---|
| KR | 2010-0089980 A | 8/2010 |
| WO | WO 1990009900 A1 | 9/1990 |

OTHER PUBLICATIONS

Youtube.com, "Ridetech Shockwaves Installed," posted Jan. 28, 2019, retrieved from https://www.youtube.com/watch?v=v9dmey_W39o; 4 pages.

\* cited by examiner

TRAILER SUSPENSION

CROSS-REFERENCE TO RELATED APPLICATIONS

This application is a continuation of U.S. application Ser. No. 18/474,999, filed on Sep. 26, 2023, the contents of which is incorporated by reference herein in its entirety.

TECHNICAL FIELD

The disclosure relates to the field of trailer suspension systems.

BACKGROUND

Vehicle trailers are equipped with a suspension system to ensure safety and stability while on the road. Current trailer suspension systems typically involve axles, springs, shock absorbers, and tires. There are different types of trailer suspensions used for different purposes, and among these, independent trailer suspensions also known as torsion suspensions are commonly used for trailers. As suggested by the name, an independent suspension system uses individual components for each wheel. Each wheel on the trailer has its own dedicated arm, shock absorber, and spring. This allows the system to absorb the shock at each wheel independently as it travels down the road.

Although a trailer suspension system provides many advantages, such a system is often limited in the load capacity and the rebound and jounce travel distance. In addition, overloaded suspension components are likely to fail, while underloaded or unloaded components may result in excessive vertical instability. In other words, when the trailer is not fully loaded or unloaded, it may cause a bumpy ride. Trailer suspensions thus must be capable of substantial deflection in a vertical direction to accept varying loads, and operate both in the loaded and unloaded condition in a safe manner. Furthermore, the weight and physical displacement of the suspension system components can affect vehicle operational parameters.

Additionally, several government regulations have been promulgated regarding trailers, and the safety of trailer suspension systems. For instance, certain regulations exist that are directed to the amount of deflection of the trailer suspension in the vertical direction based on the load, and other regulations exist regarding the safety of the trailer both in its loaded and unloaded condition. In particular, the regulations are stricter when they regard heavy freight carrying vehicles such as military vehicles.

To compensate for the shortcomings in conventional trailers and satisfy the regulations, many trailer suspension systems, particularly the torsion suspension systems for heavy freight carrying vehicles, have been proposed that include both spring and air suspension for each wheel. Air suspension can permit selective adjustment of the ride height of the trailer. In addition to providing adjustment to the ride height of the trailer, these systems can automatically maintain the level of the trailer while hauling freight on the road. While such features have increased trailer performances, air suspension systems still face problems and/or disadvantages that limit the utility of the same. For instance, forces on the struts or dampers can cause the leveling to be inexact due to undershoot or overshoot of the desired suspension level. Moreover, these systems can also attempt to level the trailer under certain conditions, such as when a trailer attached to a vehicle is traveling along a curve, for example, that could result in an improperly leveled vehicle and trailer. In addition, the spring material used in these current suspension systems is extremely stiff and can be easily damaged, and may not provide adequate suspension under no-load condition. What's more, it is difficult to achieve optimum performance of a modified suspension system that is assembled using parts and components from various companies and manufacturers for special purpose vehicles (e.g., military vehicles). The current configuration of the air suspension system requires an air spring in addition to the shock absorber and/or spring. It is, therefore, desirable to provide an improved spring and shock absorber arrangement that satisfies the regulations and simplifies the overall configuration while optimizing the trailer suspension functions and reducing the cost without loss of safety.

Therefore, improvements are needed to overcome one or more of the aforementioned shortcomings while satisfying the aforementioned requirements.

SUMMARY

Aspects of this disclosure are directed to a suspension system, a trailer having the suspension system, and a vehicle having the trailer for providing smooth drive with a simplified configuration while satisfying various regulations. In aspects, a vehicle trailer can include an air suspension system that combines the advantage of both a torsion axle and an air spring into a suspension assembly without additional shock absorbers, and can provide a more efficient and better performing suspension system. Further, the suspension system according to aspects can provide smooth ride and excellent stability. The combination of rubber/elastic member and air in series provided by the torsion axle and air spring, respectively, can ensure that the trailer has sufficient suspension and isolation in any driving condition. Further, this simple configuration can be easily adaptable for a wide range of load capacities. Furthermore, the disclosed suspension configuration can make the suspension spring rate softer while achieving a desired overall spring rang by a rocker system connecting the air spring with the torsion axle.

According to one aspect of the present disclosure, a suspension system for a trailer is disclosed. In aspects, the suspension system includes: a first bracket assembly mounted to a frame of the trailer toward the trailer tail; an air spring, one end of which is hingedly connected to the first bracket assembly; a second bracket assembly mounted to the trailer frame, another end of the air spring being hingedly connected to the second bracket assembly, wherein the second bracket is spaced apart from the first bracket; a third bracket assembly mounted to the trailer frame toward the hitch coupler, wherein the third bracket assembly is spaced apart from the second bracket assembly; and a torsion axle extending between a set of trailer wheels, wherein the torsion axle extends through an opening defined on the third bracket assembly. The air spring is configured to be controlled such that a pressure inside the air spring is adjustable. The air spring and the torsion axle are configured to dependently react to a load weight applied to the trailer.

According to another aspect of the present disclosure, a trailer is disclosed. The trailer includes a trailer frame comprising a hitch coupler and a trailer tail; a plurality of wheels connected to the main body; and a suspension system. The suspension system includes: a first bracket assembly mounted to a frame of the trailer toward the trailer tail; an air spring, one end of which is hingedly connected to the first bracket assembly; a second bracket assembly mounted to the trailer frame, another end of the air spring hingedly connected to the second bracket assembly, wherein the second bracket is spaced apart from the first bracket; a third bracket assembly mounted to the trailer frame toward the hitch coupler, wherein the third bracket assembly is spaced apart from the second bracket assembly; and a torsion axle extending between a set of trailer wheels, wherein the torsion axle extends through an opening defined on the third bracket assembly, wherein the air spring is configured to be controlled such that a pressure inside the air spring is adjustable, and wherein the air spring and the torsion axle are configured to dependently react to a load weight applied to the trailer.

According to still another aspect of the present disclosure, a vehicle is disclosed. The vehicle includes a hitch coupled to a vehicle body; and a trailer includes a suspension system and a hitch coupler configured to be coupled to the hitch. The suspension system comprises: a first bracket assembly mounted to a frame of the trailer toward the trailer tail; an air spring, one end of which is hingedly connected to the first bracket assembly; a second bracket assembly mounted to the trailer frame, another end of the air spring hingedly connected to the second bracket assembly, wherein the second bracket is spaced apart from the first bracket; a third bracket assembly mounted to the trailer frame toward the hitch coupler, wherein the third bracket assembly is spaced apart from the second bracket assembly; and a torsion axle extending between a set of trailer wheels, wherein the torsion axle extends through an opening defined on the third bracket assembly, wherein the air spring is configured to be controlled such that a pressure inside the air spring is adjustable, and wherein the air spring and the torsion axle are configured to dependently react to a load weight applied to the trailer.

Certain aspects of the disclosure have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

The accompanying drawings, which are incorporated herein and form a part of the specification, illustrate aspects of the present disclosure and, together with the description, further serve to explain the principles of the disclosure and to enable a person skilled in the pertinent art to make and use the disclosure.

Figure 1:
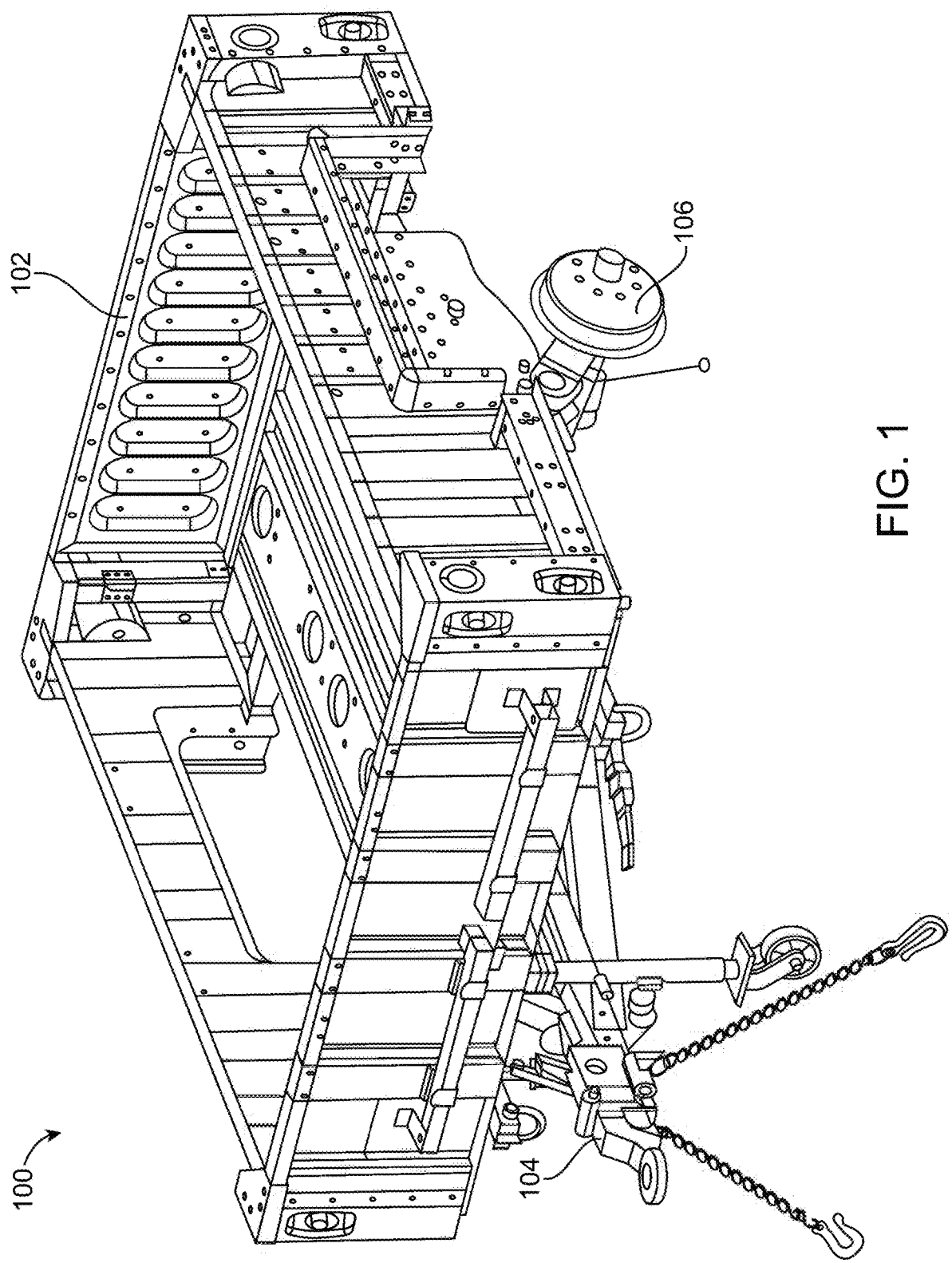
FIG. 1 shows a trailer system according to aspects of the disclosure.

Before the present disclosure is described, it is to be understood that this disclosure is not limited to particular aspects described, as such may, of course, vary. It is also to be understood that the terminology used herein is for the purpose of describing particular aspects only, and is not intended to be limiting, since the scope of the present disclosure will be limited only by the appended claims.

Unless defined otherwise, all technical and scientific terms used herein have the same meaning as commonly understood by one of ordinary skill in the art to which this disclosure belongs. Although any methods and materials similar or equivalent to those described herein can be used in the practice or testing of the present disclosure, some potential and preferred methods and materials are now described. All publications mentioned herein are incorporated by reference to disclose and describe the methods and/or materials in connection with which the publications are cited. It is understood that the present disclosure supersedes any disclosure of an incorporated publication to the extent there is a contradiction.

DETAILED DESCRIPTION

Aspects disclosed herein provide a novel air suspension system. The system provides a novel architecture over conventional systems as will be described. This architecture may provide several benefits.

The following aspects are described in sufficient detail to enable those skilled in the art to make and use the disclosure. It is to be understood that other aspects are evident based on the present disclosure, and that system, process, or mechanical changes may be made without departing from the scope of an aspect of the present disclosure.

In the following description, numerous specific details are given to provide a thorough understanding of the disclosure. However, it will be apparent that the disclosure may be practiced without these specific details. In order to avoid obscuring aspects of the present disclosure, some configurations and process steps are not disclosed in detail.

The drawings showing aspects of the system and its components are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosure may be operated in any orientation.

The term "vehicle" refers to, but is not limited to, cars, trucks, vans, trains, autonomous vehicle, aircraft, aerial drones, and the like. Further, the term "vehicle" includes electric vehicles, fuel cell vehicles, and the like, and further refers to front-wheel drive vehicles, rear-wheel drive vehicles, all-wheel drive vehicles, four-wheel drive vehicles, and the like.

FIG. 1 shows a trailer 100 configured to be coupled with a vehicle. The vehicle to be coupled with the trailer 100 may be an off road truck (e.g., military vehicle), a heavy duty truck, or other known vehicle designs. In aspects, the trailer 100 may include a trailer frame 102 providing a loading space, a hitch coupler 104 for coupling the trailer 100 to a vehicle, and a set of wheels 106 that are each coupled to a trailer suspension system and assembled with respective tires (e.g., tire 202 in FIG. 2). The trailer frame 102 is characterized by having a cargo space therein. The trailer 100 may further include various electronic devices such as a controlling unit and sensors that communicate with a trailer suspension system and a coupled vehicle.

The trailer 100 in FIG. 1 illustrates a single-axle utility trailer; however, the present disclosure is not limited to a single-axle trailer but any other axle type can be adapted, e.g., a single-axle with single tires, a single-axle with dual tires, tandem-axles with single tire, etc. Such a trailer suspension system, as will be described later, can be assembled to the wheels 106. Among various trailer axle types, a torsion axle may be installed to the trailer 100 to target specific features, such as supporting a broad range of weight loads, weight distributions and shapes. The descriptions hereinafter thus focus on a trailer suspension system having a torsion axle.

Figure 2:
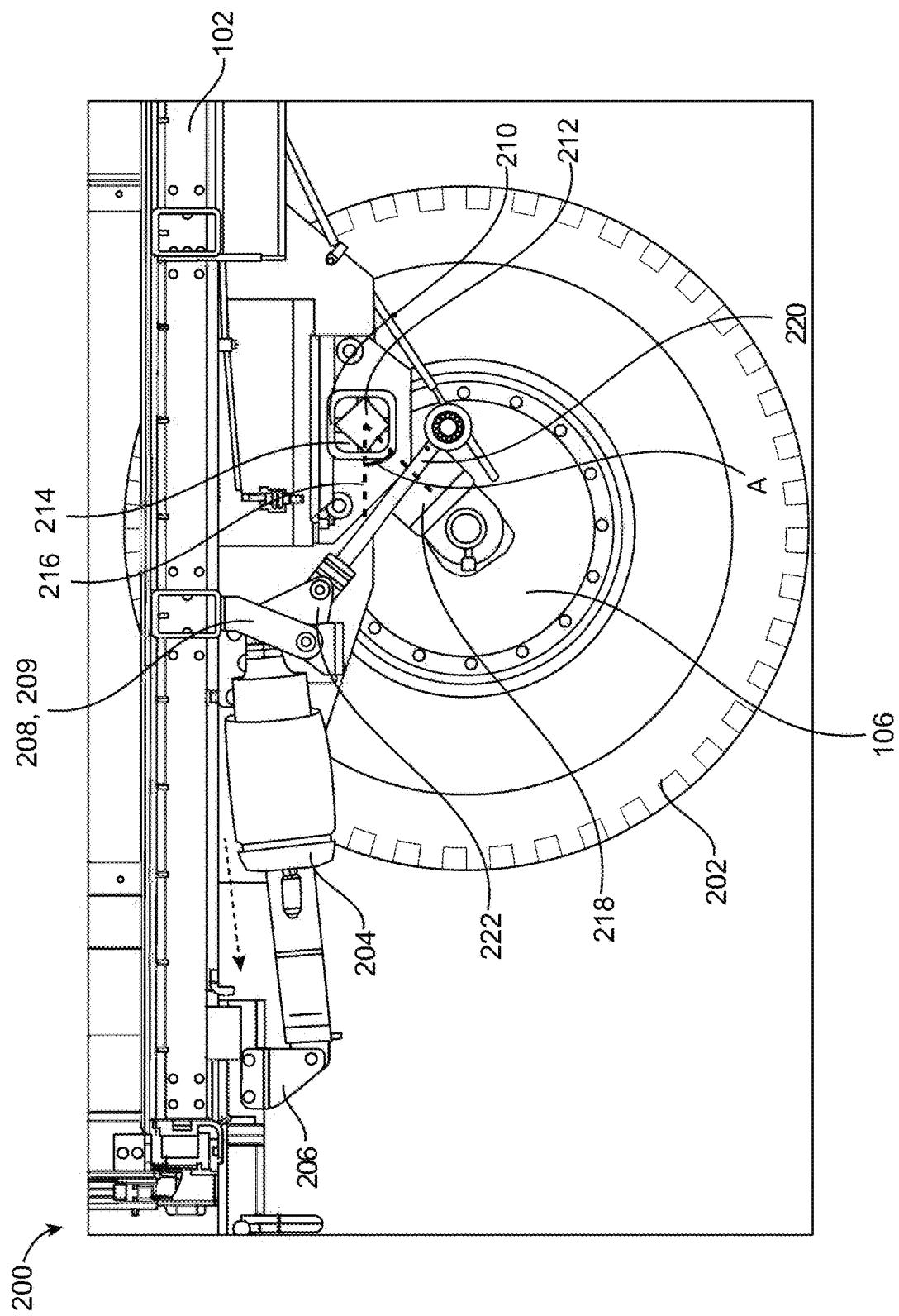
FIG. 2 shows a trailer suspension system installed to the trailer system according to aspects of the disclosure.
Figure 3:
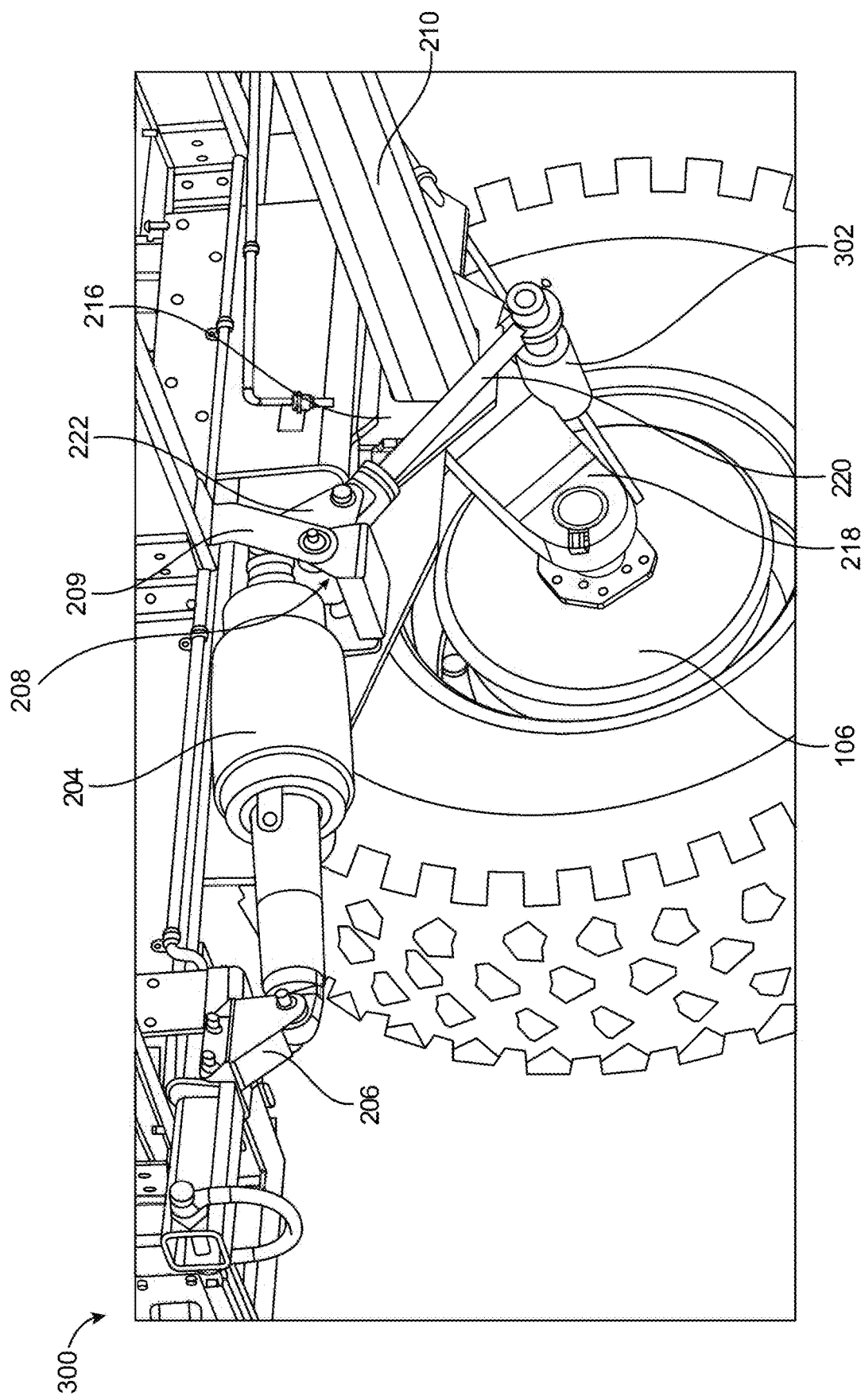
FIG. 3 shows a perspective view of the trailer suspension system of FIG. 2.

FIGS. 2 and 3 illustrate trailer suspension systems 200, 300, respectively, installed to the trailer 100 of FIG. 1. The trailer suspension system 300 of FIG. 3 is a perspective view of the trailer suspension system 200, and each of the systems 200 and 300 is a part of the trailer 100. The trailer suspension system 200 or 300 may be provided on each wheel, or one of the wheels of the trailer 100. As noted above, in aspects, the trailer suspension system 200 or 300 adapts a torsion axle suspension connected between the set of wheels 106. In aspects, the trailer suspension system 200 or 300 includes an air spring 204 ends of which being pivotably, respectively connected to a first bracket assembly 206 and a second bracket assembly 208. The bracket assemblies 206 and 208 are mounted, e.g., by bolts, to the trailer frame 102. The second bracket assembly 208 may include a U-shaped alignment bracket 209 for supporting connection portions of parts. A cylindrical-shaped air spring having a piston for achieving linear and constant spring rate throughout its travel may be used. However, other types of air spring can be used. Furthermore, the air spring can use other internal fluids rather than air for its operation, although air is the preferred fluid which can be supplied thereto from a compressor (not shown) mounted within the trailer and connected to the air spring. Alternatively, the air spring can be filled and pressured with air or other type of fluid to a certain pressure for a specific payload, from an externally provided source.

When the air spring 204 is used, the trailer suspension system 200 or 300 may further include an air compressor that supplies compressed air allowing the air spring 204 to act like a spring as well as a shock absorber. The pressure inside the air spring 204 can be adjusted, either manually or automatically, based on the weight of the trailer loads. For instance, an operator can manually open a pressure valve to control the pressure inside the air spring 204 based on the known load weight. Alternatively or additionally, a sensor, e.g., a potentiometer or the like, may be provided in the trailer suspension system 200 or 300 to estimate the load weight based on the displacement or change in angle in the suspension system 200 or 300. Accordingly, it is possible to provide a relatively constant smooth ride by adjusting the air spring pressure based on the trailer weight, regardless of the load weight. In aspects, the air spring 204 is of a usual well-known construction for a solid rear axle installation, e.g., RideTech 7000 series shockwave air spring having a lower load capacity and a softer spring rate that is appropriate for the rear of most vehicles with a solid rear axle. Such an air spring has a straight piston configuration for a linear, or constant spring rate, throughout its travel, causing a reciprocation motion of the piston between compressed and uncompressed conditions. Thus, the air spring 204 can function as a spring as well as a shock absorber. Further, the air spring 204 used for the trailer suspension system 200 or 300 may be configured to support a suitable weight for a military vehicle, e.g., between approximately 800 lbs to approximately 1,000 lbs at 100 psi. In certain aspects, the suitable weight may be 980 lbs at 100 psi.

The trailer suspension system 200 or 300 further includes a torsion axle 210 extending between the set of wheels 106, and indirectly engaged with the air spring 204. The torsion axle 210 is a hollow tubing, in which a torsion shaft 212 extends along the tubing and is surrounded by a plurality of elastic members 214. The torsion axle 210 is similar to a well-known torsion axle. That is, the plurality of elastic members 214 are pressed fitted within the hollow tubing and resiliently support the torsion shaft 212.

In aspects, the plurality of elastic members 214 may be formed of rubber materials. Rubber can elastically deform in a predictable manner in response to torsion forces, thereby absorbing the torsional stress to the torsion axle. By changing the material of the plurality of elastic members 214, the stiffness of the torsion axle 210 can be adjusted, e.g., softer rubber material results in a softer stiffness, which affects the suspension functionality. The rubber materials used for the plurality of elastic members 214 may include Natural Rubber (NR), Styrene-butadiene rubber (SBR), Butyl (IIR), Nitrile (NBR), Neoprene® (CR), Ethylene Propylene Diene Monomer (EPDM), Silicone (Q), Viton® (FKM), Polyurethane (AU), Hydrogenated Nitrile (HNBR), or the like.

In some aspects, materials of the plurality of elastic members 214 can affect the spring rate of the torsion axle 210. Accordingly, it is possible to reduce the spring rate in the torsion axle 210 to achieve a greater range of spring rate, which then provides a wider range of payload in the trailer due to the increased range of adjustment while still achieving the same overall system spring rate. In aspects, the durometer of the elastic members 214 can be reduced by a predetermined amount. For example, in aspects the durometer can be reduced to result in a decrease by a factor of 50% or less in spring rate for the torsion axle 210.

Since such a rubber torsion spring system of the torsion axle 210 is in series with the air spring 204 with any load applied to the system and since each spring is in the path of the forces being applied and each spring deflects in inverse proportion to its spring rate, the springs of the torsion axle 210 (e.g., the plurality of elastic members 214) can have a lower spring rate so as to deflect under an unloaded or relatively light load condition (e.g., a predetermined load weight of 2,000 lbs or less) without any contribution of the air spring 204. For example, the plurality of elastic members 214 may have a spring rate in a range of approximately 2,500 lbf/in to 11,000 lbf/in. In certain aspects, the spring rate may be 2612.4 lbf/in to 10261.6 lbf/in. On the other hand, under a fully loaded condition (e.g., more than 2,000 lbs), the air spring 204 comes into effect so as to provide the spring resistance causing both springs to deflect. That is, the torsion axle 210 and the air spring 204 operate relative to each other in relation to the combination of wheel rotation and load weight, to cover the wide range of trailer load weight.

For example, at the start of a jounce movement when a slight rotational force is applied to the torsion shaft 212 due to a light load weight, such a force is absorbed by the plurality of elastic members 214 allowing zero to minimal rotation of the torsion shaft 212. In a full jounce position where the wheels 106 experience a greater vertical movement due to a heavy load weight, the torsion shaft 212 may rotate further with some limitations. The rotation of the torsion shaft 212 then may cause reciprocation movement of the air spring 204. In a rebound movement, the torsion axle 210 and the air spring 204 operate in a similar way but in an opposite direction (e.g., the torsion shaft 212 rotates in a direction opposite to that of the direction of the jounce movement). Rebound is a result of recovery, that is, a discharge of energy stored in the suspension systems of both the air spring 204 and the plurality of elastic members 214 in the torsion axle 210 from inputs from bumps, etc. The torsion axle 210 complements the air spring 204 to provide increased stability to the suspension system 200 or 300 by absorbing various twisting, up-and-down, or side-to-side displacements exerted on the trailer wheels 106. Further, such a torsion axle system having elastic members in conjunction with the air spring can provide roll control for stability and diagonal compliance to allow the suspension system to function on uneven terrain regardless of the load weight.

The suspension system 200 or 300 according to various aspects can achieve all of the advantages achieved by torsion axle suspension systems while improving suspension functions and satisfying the government regulations with a simple configuration. In addition, a shock absorber used in many trailer suspension systems can be omitted without losing shock absorber functionality. That is, a cost reduction is further achieved by adopting an air spring having air bag functions (e.g., reducing bouncing movement) as well as spring functions.

In aspects, the torsion axle 210 is supported by a third bracket assembly 216 attached to the trailer frame 102. The third bracket assembly 216 is located closer to hitch coupler 104 than the bracket assemblies 206 and 208. Referring to FIG. 3, the third bracket assembly 216 has an opening through which the torsion axle 210 is secured. The torsion shaft 212 of the torsion axle 210 further extends out from the torsion axle 210 and is welded to an opening of a torsion arm 218. The torsion arm 218 carries the respective wheel and brake assemblies. Thus, while one end of the torsion arm 218 is welded with the torsion shaft 212, the other end thereof is connected to the wheel assembly (e.g., wheel spindle). Known torsion axle configurations can be used.

In aspects, the respective wheel 106 makes the jounce and rebound movement on uneven terrain while the trailer frame 102 remain stable by the torsion arm 218 having the one end moving along with the movement of the wheel 106 and the other end rotated by the torsion shaft 212. The torsion arm 218 is further engaged, indirectly, with the air spring 204 via a torsion bar tie rod 220 and a rocker arm 222. The rocker arm 222 may have three end points each of which is pivotably connected to a suspension system element. In aspects, at the second bracket assembly 208, which is mounted to the trailer frame 102 between the first and third bracket assemblies 206, 216, one end of the air spring 204 is pivotably connected to a first end point of the rocker arm 222. In certain aspects, the U-shaped alignment bracket 209 and the rocket arm 222 together form the second bracket assembly 208. The tie rod 220, one end thereof, is then pivotably connected to a second end point of the rocker arm 222 allowing the tie rod 220 to pivot in relation with the air spring 204. Referring to FIG. 3, the other end of the tie rod 220 is engaged with the torsion arm 218 by a connecting rod 302 bolted to the torsion arm 218. A third end point of the rocker arm 222 is pivotably connected to the second bracket assembly 208. Accordingly, the connecting rod 302 makes a pivoting motion with the torsion arm 218 by being connected thereto, redirecting the force of the respective wheel 106 to the tie rod 220, to the rocker arm 222, and finally to the air spring 204.

In aspects, the trailer height can be managed by an angle "A" of the torsion arm 218 relative to the horizontal plane. The torsion arm 218 can be set to be located at different angles when the suspension system 200 or 300 is in the unloaded position and when the suspension system 200 or 300 is at equilibrium. The unloaded position is the position the suspension system 200 or 300 is in when no other forces other than the weight of the trailer 100 are acting on the suspension system 200 or 300. For instance, without any height adjustment, the angle "A" changes based on the load weight on the trailer. Thus, based on the load weight, the adjustment of the angle "A" allows for a stable drive at different load weights while maintaining the trailer height.

Additionally, the pressure inside the air spring 204 can be adjusted based on the angle "A" of the torsion arm 218. As described previously, the angle "A" can vary, without external adjustment, based on the trailer load weight. Therefore, based on the weight and angle "A" relationship, the pressure inside the air spring 204 can be adjusted to provide adequate suspension function. Spring stiffness of the air spring 204 is then adjusted in line with the air pressure adjustment. As also noted above, the suspension system 200 or 300 may be provided with one or more sensors for sensing, e.g., a displacement of the torsion shaft 212, a load weight applied to the trailer 100, an angular displacement of the torsion arm 218, or the like. Based on the sensing data (e.g., angle "A") obtained by the one or more sensors, the air pressure inside the air spring 204 can be adjusted dynamically and automatically. The sensing data and sensors are not limited hereto; however, any adequate sensor can be used to measure various variables for estimating the load weight.

In aspects, the trailer 100 may be equipped with a pressure chamber which fluidly-communicates with the air spring 204. As described above, an operator then can manually adjust the air spring pressure by opening a valve or by entering a desired value to a connected computing device. In certain aspects, the trailer 100 may have a control unit which communicates with one or more sensors (e.g., a potentiometer, an angular sensor, etc.) for detecting the angular displacement of the torsion arm 218 or torsion shaft 212. Based on the detected sensing value, the control unit controls delivery of air into the air spring 204 to adjust the pressure therein. Further, each air spring 204 for the respective wheel can be independently pressure-adjusted.

With the above-described novel configuration utilizing the air spring as a shock absorber as well as a spring providing adjustable spring rate/stiffness, beyond all the advantages described above, it is further possible to reduce the cost by using a softer rubber material for the plurality of elastic members 214, i.e., rubber having a softer spring stiffness, while providing for a stable drive. That is, in the unloaded condition, the suspension system 100 can operate from the softest portion of the rubber suspension spring rate curved to provide the maximum dampening benefit of the torsion axle assembly.

Figure 4:
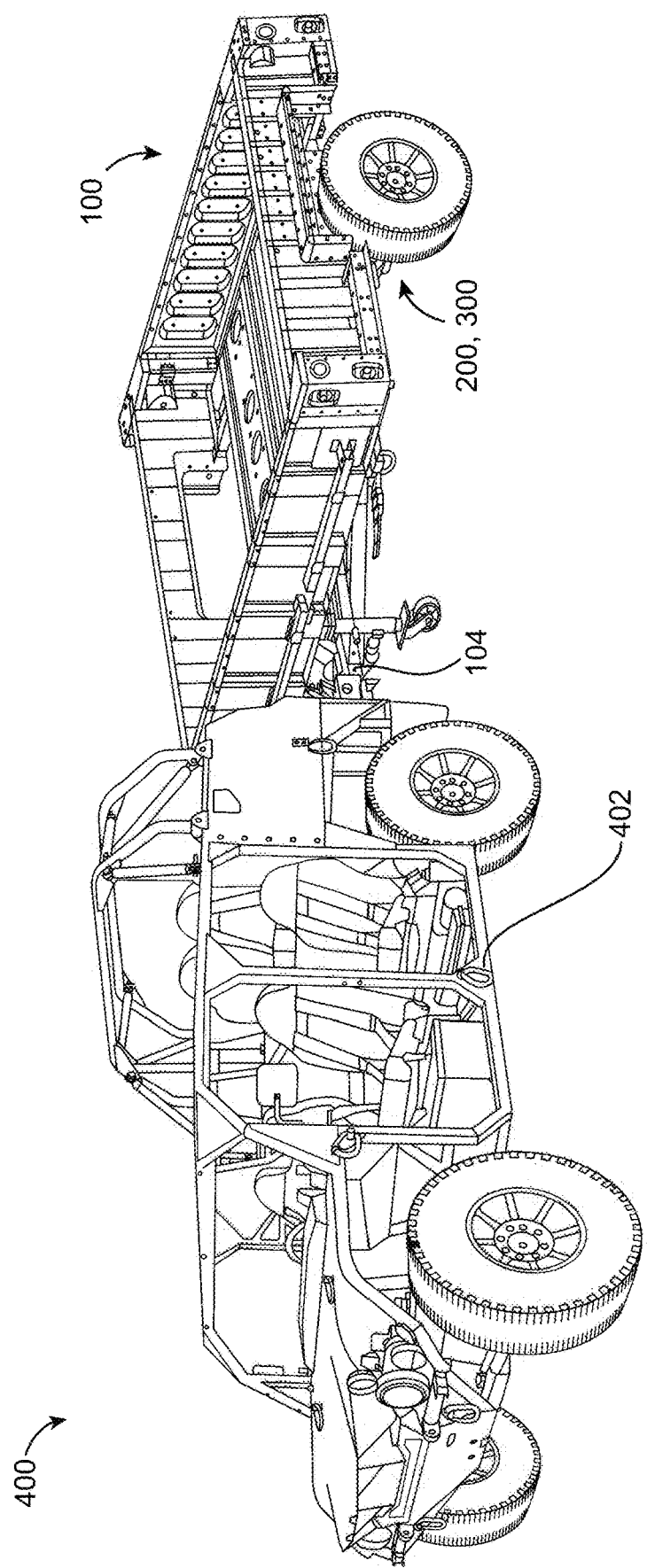
FIG. 4 shows a vehicle trailer system according to aspects of the disclosure.

FIG. 4 shows a vehicle system 400 in which the trailer 100 is coupled to a vehicle 402 via the hitch coupler 104. The vehicle system 400 in FIG. 4 illustrates a military vehicle system; however, the above-described suspension system can be applied to any vehicle and a trailer type for smooth ride quality, particularly on uneven, rough roads. In aspects, the vehicle 402 may be an electric vehicle operating by a battery and a motor; however it is not limited to an electric vehicle but it may include a hybrid vehicle, a fuel cell vehicle, etc.

It is to be appreciated that the Detailed Description section, and not the Abstract is intended to be used to interpret the claims. The Abstract section may set forth one or more but not all possible aspects of the present disclosure as contemplated by the inventor(s), and thus, is not intended to limit the subjoined claims in any way.

The foregoing disclosure outlines features of several aspects so that those skilled in the art may better understand the aspects of the present disclosure. Those skilled in the art will appreciate that they may readily use the present disclosure as a basis for designing or modifying other processes and structures for carrying out the same purposes and/or achieving the same advantages of the aspects introduced herein. Those skilled in the art will also realize that such equivalent constructions do not depart from the spirit and scope of the present disclosure, and that they may make various changes, substitutions, and alterations herein without departing from the spirit and scope of the present disclosure.

What is claimed is:

1. A method of controlling a suspension system for a trailer, wherein the suspension system comprises: a first bracket assembly disposed adjacent a tail of the trailer, an air spring connected to the first bracket assembly, a second bracket assembly connected to the air spring, and a third bracket assembly disposed adjacent a hitch coupler of the trailer, the method comprising:
receiving a load weight of the trailer;
comparing the load weight with a predetermined load weight;
determining that the load weight is higher than the predetermined load weight; and
upon determining that the load weight is higher than the predetermined load weight, adjusting a pressure inside the air spring for the air spring to absorb the load weight that is higher than the predetermined load weight.

2. The method of claim 1, further comprising adjusting a torsion axle to absorb the predetermined load weight applied to the trailer.

3. The method of claim 2, wherein adjusting the torsion axle comprises adjusting a stiffness of the torsion axle.

4. The method of claim 1, wherein the pressure inside the air spring is adjusted by adjusting an angle of a torsion arm relative to a horizontal plane.

5. The method of claim 1, wherein the load weight of the trailer is received from one or more sensors of the trailer.

6. The method of claim 5, wherein the pressure inside the air spring is adjusted by a control unit based on sensor data.

7. The method of claim 1, wherein the pressure inside the air spring is manually adjusted by a user.

8. The method of claim 5, wherein the one or more sensors comprise at least one of a potentiometer or an angular sensor disposed in the suspension system and configured to measure at least one of a displacement or change in angle in the suspension system.

9. The method of claim 1, wherein the air spring is one of a plurality of air springs of the suspension system, and wherein each of the plurality of air springs is independently adjusted to adjust a pressure inside each of the plurality of air springs.

10. The method of claim 1, wherein the air spring is configured to support a load weight up to 1,000 lbs at 100 psi.

11. A method of assembling a suspension system for a trailer, the method comprising:
providing a first bracket assembly to a trailer frame toward a tail of the trailer;
providing an air spring, a first end of which is hingedly connected to the first bracket assembly;
providing a second bracket assembly to the trailer frame and to be spaced apart from the first bracket assembly, a second end of the air spring hingedly connected to the second bracket assembly;
providing a third bracket assembly to the trailer frame toward a hitch coupler of the trailer to be spaced apart from the second bracket assembly; and
providing a torsion axle between a set of trailer wheels, wherein the torsion axle extends between the set of trailer wheels through an opening defined on the third bracket assembly.

12. The method of claim 11, further comprising:
providing a torsion arm to be hingedly connected between a wheel spindle of a respective wheel and the torsion axle, wherein the torsion arm comprises an opening configured to receive the torsion axle; and
providing a torsion bar tie rod to be connected between the second end of the air spring and the torsion arm.

13. The method of claim 12, wherein the providing the second bracket assembly comprises:
mounting an alignment bracket having a "U" shape to the trailer frame;
connecting ends of a rocker arm to the alignment bracket, the air spring, and the torsion bar tie rod, respectively; and
connecting a connecting rod to the torsion bar tie rod, wherein the rocker arm is rotatably connected, and
wherein the torsion bar tie rod is bolted to the torsion arm and configured to move along with the torsion arm.

14. The method of claim 13, wherein the torsion axle comprises a torsion housing in which a torsion shaft and a plurality of elastic members extend along the torsion housing,
wherein the torsion shaft is rotatably surrounded by the plurality of elastic members and extends further from the torsion housing to the opening of the torsion arm,
wherein the torsion arm is configured to rotate along with the torsion shaft,
wherein the rotation of the torsion shaft is limited based on a load weight in relation to a spring rate of the plurality of elastic members, and
wherein the spring rate of the plurality of elastic members is in a range of 7,500 lbf/in to 10,000 lbf/in.

15. The method of claim 12, wherein a pressure inside the air spring is adjusted based on sensing data, and
wherein the sensing data includes at least one of a displacement of a torsion shaft, a load weight applied to the trailer, or an angular displacement of the torsion arm.

16. A method of assembling a trailer to a vehicle, the method comprising:
coupling a hitch coupler of the trailer to a hitch of the vehicle, the trailer including a suspension system comprising:
a first bracket assembly mounted to a trailer frame toward a tail of the trailer;
an air spring, one end of which is hingedly connected to the first bracket assembly;
a second bracket assembly mounted to the trailer frame, another end of the air spring hingedly connected to the second bracket assembly, wherein the second bracket assembly is spaced apart from the first bracket assembly;
a third bracket assembly mounted to the trailer frame toward the hitch coupler, wherein the third bracket assembly is spaced apart from the second bracket assembly; and
a torsion axle extending between a set of trailer wheels, wherein the torsion axle extends through an opening defined on the third bracket assembly,
wherein the air spring is configured to be controlled such that a pressure inside the air spring is adjustable, and
wherein the torsion axle is configured to absorb a predetermined load weight applied to the trailer, and the air spring is configured to absorb a load weight higher than the predetermined load weight.

17. The method of claim 16, further comprising manually entering an air pressure of the air spring.

18. The method of claim 16, further comprising dynamically varying an air pressure of the air spring based on sensing data,
  wherein the sensing data includes at least one of a load weight applied to the trailer or an angular displacement of the torsion axle.

19. The method of claim 16, wherein the vehicle is a military vehicle.

\* \* \* \* \*